United States Patent
Gu et al.

(10) Patent No.: US 11,321,777 B1
(45) Date of Patent: May 3, 2022

(54) BUSINESS DATA PROCESSING METHOD AND COMPUTER DEVICE

(71) Applicant: Shanghai IceKredit, Inc., Shanghai (CN)

(72) Inventors: Lingyun Gu, Shanghai (CN); Minqi Xie, Shanghai (CN); Wan Duan, Shanghai (CN); Tao Zhang, Shanghai (CN); Yizeng Huang, Shanghai (CN)

(73) Assignee: Shanghai IceKredit, Inc., Shanghai (CN)

(*) Notice: Subject to any disclaimer, the term of this patent is extended or adjusted under 35 U.S.C. 154(b) by 0 days.

(21) Appl. No.: 17/462,028

(22) Filed: Aug. 31, 2021

(30) Foreign Application Priority Data

Dec. 24, 2020 (CN) .......................... 202011544363.3

(51) Int. Cl.
*G06Q 40/02* (2012.01)
*G06N 20/00* (2019.01)

(52) U.S. Cl.
CPC ........... *G06Q 40/025* (2013.01); *G06N 20/00* (2019.01)

(58) Field of Classification Search
None
See application file for complete search history.

(56) References Cited

U.S. PATENT DOCUMENTS 10,452,992 B2 * 10/2019 Lee .......................... G06N 20/00
10,902,428 B1 * 1/2021 Amram ............... G06Q 20/4016

FOREIGN PATENT DOCUMENTS

| CN | 111932041 A | | 11/2020 |
| CN | 112017040 A | * | 12/2020 |
| CN | 112039702 A | | 12/2020 |
| WO | 2020208359 A1 | | 10/2020 |

OTHER PUBLICATIONS

Z. Kun, F. Weibing and W. Jianlin, "Default Identification of P2P Lending Based on Stacking Ensemble Learning," 2020 2nd International Conference on Economic Management and Model Engineering (ICEMME), 2020, pp. 992-1006, doi: 10.1109/ICEMME51517.2020.00203. (Year: 2020).*

M. Puh and L. Brkić, "Detecting Credit Card Fraud Using Selected Machine Learning Algorithms," 2019 42nd International Convention on Information and Communication Technology, Electronics and Microelectronics (MIPRO), 2019, pp. 1250-1255, doi: 10.23919/MIPRO.2019.8757212. (Year: 2019).*

* cited by examiner

*Primary Examiner* — Gregory S Cunningham, II
(74) *Attorney, Agent, or Firm* — Bayramoglu Law Offices LLC

(57) ABSTRACT

A business data processing method includes: step S1: extracting domestic business sample data; step S2: selecting a sample data set S by training a model; step S3: extracting overseas business sample data; step S4: merging the data set S and a data set T to obtain a data set A; step S5: setting an initial sample weight; step S6: setting a variable for a quantity of iterations; step S7: training the model based on a current weight to obtain a model At; step S8: calculating a loss et of the model At in the data set T; step S9: caching the model At and the loss et; step S10: updating a sample weight; step S11: updating the quantity of iterations t=t+1; step S12: determining whether a termination condition is met; and step S13: when the termination condition is met, determining a final model.

20 Claims, 1 Drawing Sheet

BUSINESS DATA PROCESSING METHOD AND COMPUTER DEVICE

CROSS REFERENCE TO THE RELATED APPLICATIONS

This application is based upon and claims priority to Chinese Patent Application No. 202011544363.3, filed on Dec. 24, 2020, the entire contents of which are incorporated herein by reference.

TECHNICAL FIELD

The present invention relates to the technical field of data feature processing, and specifically, to a business data processing method and a computer device.

BACKGROUND

With the development of global economic integration, financial credit and loan businesses in different regions are also developing interactively. When a financial credit and loan business is processed, big data risk control needs to be implemented. To ensure compatibility of a big data risk control system in different regions, it is necessary to establish a risk control model based on sample data. However, sizes of sample data in different regions are different, and this will cause a bias of prediction accuracy of risk control models established for various regions.

SUMMARY

To resolve the above problems, the present invention provides a business data processing method and a computer device.

According to a first aspect, a business data processing method is provided, where the method is applied to a computer device, and includes the following steps:

step S1: obtaining, from a target data platform, first anti-fraud variables and first fraudulent customer labels of P first business projects in a first business region to form P first anti-fraud modeling sample data sets, where the first anti-fraud variables are used as first prediction variables for modeling, the first fraudulent customer labels are used as first response variables for modeling, and P is a positive integer;

step S2: training one target model based on each of the P first anti-fraud modeling sample data sets, selecting, from P target models, a model with a highest area under curve (AUC) value as a model S, determining a modeling sample data set of the model S as a data set S, and using a variable combination of the model S as a variable combination S;

step S3: obtaining, from the target data platform, a second anti-fraud variable and a second fraudulent customer label of a second business project in a second business region based on the variable combination S to form a second anti-fraud modeling sample data set T, where the second anti-fraud variable is used as a second prediction variable for modeling, and the second fraudulent customer label is used as a second response variable for modeling;

step S4: merging the data set S and the data set T to obtain a data set A, where a quantity of samples in the data set S is n, and a quantity of samples in the data set T is m; and numbering sample individuals in the data set A from 1 to n+m, where sample individuals numbered from 1 to n are from the data set S, sample individuals numbered from n+1 to n+m are from the data set T, and n and m are positive integers;

step S5: allocating initial weights to the sample individuals in the data set A;

step S6: setting an integer variable t for recording a quantity of iterations, and setting the variable t to 1, where t is a positive integer;

step S7: training a model At for the data set A based on a current sample weight by using the variable combination S;

step S8: calling the model At to predict the samples in the data set A and output a probability of a fraudulent label, and determining a prediction loss et of the model At relative to the data set T;

step S9: determining a prediction performance indicator AUC of the model At relative to the data set T, and caching the prediction performance indicator AUC and a model prediction result corresponding to the probability of the fraudulent label;

step S10: determining and updating weights of the samples in the data set T based on the prediction loss et;

step S11: updating and iterating the variable t, and increasing a value of the variable t by 1;

step S12: performing cyclic iteration on steps S7 to S11 until an iterative cycle condition is met, to obtain x to-be-processed models; and step S13: determining a final model based on a prediction performance indicator AUC of each to-be-processed model in the x to-be-processed models relative to the data set T, and extracting a model parameter corresponding to the final model to be a modeling parameter corresponding to the second business project.

Optionally, in step S5, the step of allocating the initial weights to the sample individuals in the data set A includes:

setting a weight of each sample individual of the data set A from the data set S to 1/n; and setting a weight of each sample individual of the data set A from the data set T to 1/m.

Optionally, the target model in step S2 is a logistic regression model.

Optionally, the target model in step S2 is a random forest model.

Optionally, the target model in step S2 is a support vector machine.

Optionally, the iterative cycle condition in step S12 is: an increase in the prediction performance indicator AUC cached in step S9 meets a preset condition.

Optionally, that the increase in the prediction performance indicator AUC cached in step S9 meets the preset condition includes: the increase in the prediction performance indicator AUC cached in step S9 is less than 5% for five consecutive rounds.

According to a second aspect, a computer device is provided, including a business data processing apparatus, where the business data processing apparatus is configured to execute the method in the first aspect.

According to a third aspect, a computer device is provided, including a processor and a memory, where the processor and the memory communicate with each other, and the processor is configured to obtain a computer program from the memory and run the computer program to implement the method in the first aspect.

According to a fourth aspect, a computer-readable storage medium is provided, where a computer program is stored on the computer-readable storage medium, and the computer program is configured to be run to implement the method in the first aspect.

Embodiments of the present invention provide a business data processing method and a computer device, which can effectively increase a weight of a sample, of an original model, similar to a sample in a second business region and decrease a weight of a sample, of the original model, not similar to the sample in the second business region through algorithm design, so that a step-by-step iteration when modeling data can be effectively obtained in both a first business region and the second business region. Based on a specified early stopping mechanism, a cycle is terminated when performance of the model is not significantly improved in a plurality of iterations. In this way, subjectivity of manually setting a quantity of iterations is avoided. In addition, when the cycle is terminated, a model with best performance in the plurality of iterations can be selected for actual deployment, thereby avoiding deployment of all models in the iterations and complexity of output results of the models. This can improve generalization performance of a risk control model, to avoid a bias of prediction accuracy.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. A person of ordinary skill in the art may still derive other related drawings from these accompanying drawings without creative efforts.

DETAILED DESCRIPTION OF THE EMBODIMENTS

Figure 1:
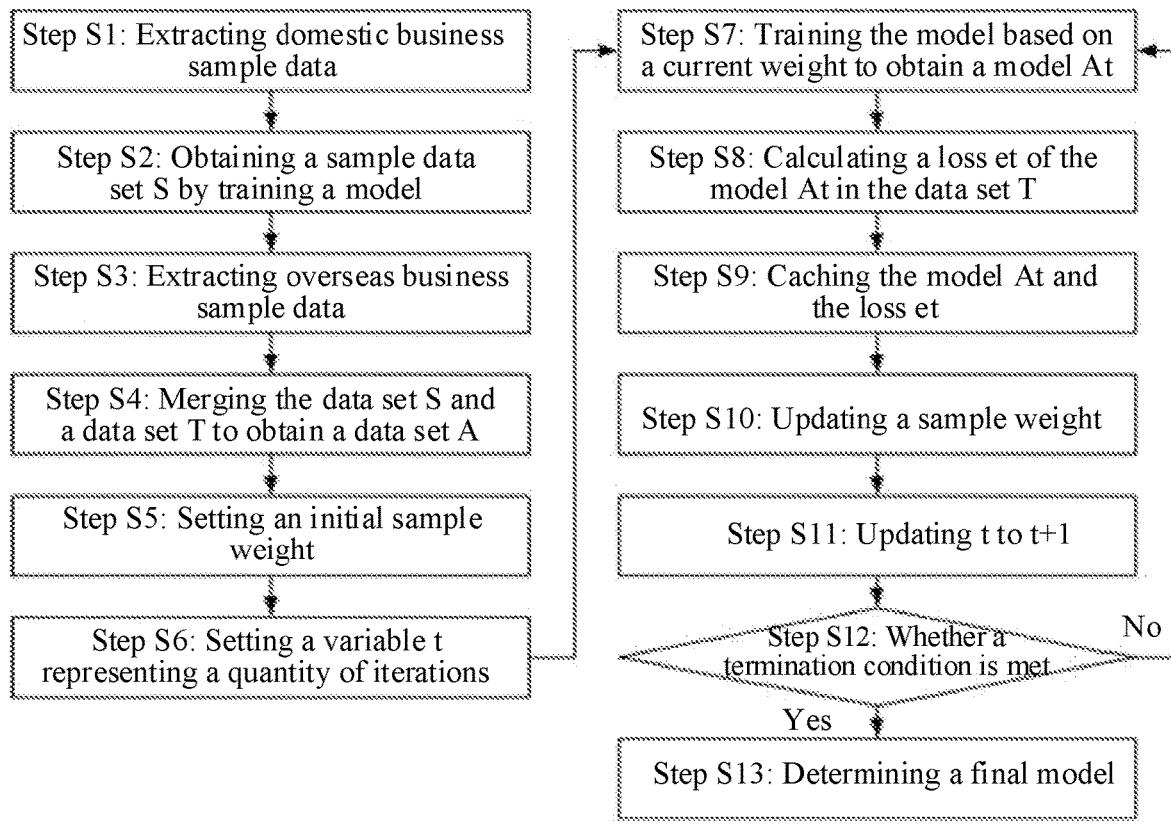
FIG. 1 is a flowchart of a business data processing method according to an embodiment of the present invention.

For the sake of a better understanding of the above technical solutions, the technical solutions in the present invention are described in detail with reference to the accompanying drawings and specific embodiments. It should be understood that the embodiments in the present invention and specific features in the embodiments are detailed descriptions of the technical solutions in the present invention, and are not intended to limit the technical solutions in the present invention. The embodiments in the present invention and technical features in the embodiments may be combined with each other in a non-conflicting situation.

In recent years, many domestic credit and loan agencies have carried out inclusive financial credit and loan business overseas, especially in developing countries such as Southeast Asia and South Asia, hoping to apply the advanced big data risk control system accumulated in China in recent years to overseas markets. The anti-fraud risk control system of an overseas business is of great significance for stable and healthy development of a credit and loan business.

However, overseas customer groups are quite different from domestic customer groups, and there are not enough fraud samples to develop anti-fraud strategies and models. Based on information data of mobile devices and model algorithm designs that can be obtained at home and abroad, the present invention effectively merges samples of device-based transnational anti-fraud models, effectively adds samples for establishment of anti-fraud models in new business scenarios, and enhances model predictability and stability.

Through algorithm design, the present invention is mainly intended to use samples of a transnational fraud model as auxiliary samples to expand available samples when there are only a few available fraud samples. This can effectively improve a prediction capability and reduce a prediction bias of the model that is caused by supplementary samples.

The device-based anti-fraud model identifies a fraudulent customer who applies for a loan maliciously, based on a machine learning model as well as device environment information, device fingerprint information, and device application installation information that are collected by a mobile software development kit (SDK). The device information field includes many dimensions, so a large quantity of samples are needed to develop the model. Through algorithm design, the present invention screens rich sample data in one scenario, and adds screened sample data to samples in another scenario to develop an anti-fraud model for the new scenario.

The common practice in the industry is to directly apply the device-based anti-fraud model established based on a large amount of domestic data to an overseas credit and loan market, and then re-develop an anti-fraud model when there are sufficient samples.

When customer groups are significantly different, directly applying a model developed based on other samples will increase a prediction bias of the model. This will cause serious fraud risks in the anti-fraud field, causing a liquidity risk.

The present invention also applies samples and models of domestic businesses to overseas businesses, and creatively adjusts weights of a sample from a target customer group (overseas business sample) and a sample from an auxiliary customer group (domestic business sample) based on a modeling prediction loss at an algorithm level, so that samples obtained after weighted fusion are more approximate to a target customer group, and a modeling result is more suitable for the target customer group, thereby reducing the prediction bias, and enhancing accuracy and stability of model prediction.

Based on the above descriptions, FIG. 1 schematically shows a business data processing method. The method may include the following steps S1 to S13.

Step S1: Obtain, from a target data platform, first anti-fraud variables and first fraudulent customer labels of P first business projects in a first business region to form P first anti-fraud modeling sample data sets, where the first anti-fraud variables are used as first prediction variables for modeling, the first fraudulent customer labels are used as first response variables for modeling, and P is a positive integer.

For example, the target data platform may be a data platform of a risk control system of an agency.

For example, the first business region may be a domestic region.

For example, the business project may be a credit and loan product.

The credit and loan product needs to meet the following conditions:

(1) a type of the product is the same as that of an overseas credit and loan product, for example, they are both consumption staged products;

(2) after a period of operation, fraudulent customers have been identified for the product based on user repayment performance and post-loan investigation; and (3) customers' device information (device models, and the like), behavior information (registration, application, login, and the like), geographic location information (longitudes and latitudes, motion tracks, and the like), software installation information (application lists, and the like), and other information are obtained for the product by using a burying point of a mobile device application, and are processed to generate variables for anti-fraud modeling; and these anti-fraud variables can be generated based on information collected in an overseas business.

Step S2: Train one target model based on each of the P first anti-fraud modeling sample data sets, select, from the P target models, a model with a highest AUC value as a model S, determine a modeling sample data set of the model S as a data set S, and use a variable combination of the model S as a variable combination S.

Step S3: Obtain, from the target data platform, a second anti-fraud variable and a second fraudulent customer label of a second business project in a second business region based on the variable combination S to form a second anti-fraud modeling sample data set T, where the second anti-fraud variable is used as a second prediction variable for modeling, and the second fraudulent customer label is used as a second response variable for modeling.

For example, the second business region may be an overseas region.

Step S4: Merge the data set S and the data set T to obtain a data set A, where a quantity of samples in the data set S is n, and a quantity of samples in the data set T is m; and number sample individuals in the data set A from 1 to n+m, where sample individuals numbered from 1 to n are from the data set S, sample individuals numbered from n+1 to n+m are from the data set T, and n and m are positive integers.

Step S5: Allocate initial weights to the sample individuals in the data set A.

Step S6: Set an integer variable t for recording a quantity of iterations, and set the variable t to 1, where t is a positive integer.

Step S7: Train a model At for the data set A based on a current sample weight by using the variable combination S.

Step S8: Call the model At to predict the samples in the data set A and output a probability of a fraudulent label, and determine a prediction loss et of the model At relative to the data set T.

Step S9: Determine a prediction performance indicator AUC of the model At relative to the data set T, and cache the prediction performance indicator AUC and a model prediction result corresponding to the probability of the fraudulent label.

Step S10: Determine and update weights of the samples in the data set T based on the prediction loss et.

When the weights are updated, parameters Bt and B may be set. These two parameters can be calculated based on the prediction loss et. Such a design can realize the following functions:

(1) For the sample individuals, from the data set S, in the data set A, when the sample individuals are correctly predicted by the model, their weights are decreased; when the sample individuals are incorrectly predicted, their weights are increased.

(2) For the sample individuals, from the data set T, in the data set A, when the sample individuals are correctly predicted by the model, their weights are increased; when the sample individuals are incorrectly predicted, their weights are decreased.

Step S11: Update and iterate the variable t, and increase a value of the variable t by 1.

Step S12: Perform cyclic iteration on steps S7 to S11 until an iterative cycle condition is met, to obtain x to-be-processed models.

Step S13: Determine a final model based on a prediction performance indicator AUC of each to-be-processed model in the x to-be-processed models relative to the data set T, and extract a model parameter corresponding to the final model to be a modeling parameter corresponding to the second business project.

Based on the above steps S1 to S13, a weight of a sample, of an original model, similar to a sample in a second business region can be effectively increased and a weight of a sample, of the original model, not similar to the sample in the second business region can be decreased through algorithm design in a step-by-step iteration when modeling data can be effectively obtained in both a first business region and the second business region. Based on a specified early stopping mechanism, a cycle is terminated when performance of the model is not significantly improved in a plurality of iterations. In this way, subjectivity of manually setting a quantity of iterations is avoided. In addition, when the cycle is terminated, a model with best performance in the plurality of iterations can be selected for actual deployment, thereby avoiding deployment of all models in the iterations and complexity of output results of the models. This can improve generalization performance of a risk control model, to avoid a bias of prediction accuracy.

Optionally, in step S5, the step of allocating the initial weights to the sample individuals in the data set A includes:
setting a weight of each sample individual of the data set A from the data set S to 1/n; and
setting a weight of each sample individual of the data set A from the data set T to 1/m.

Optionally, the target model in step S2 is a logistic regression model.

Optionally, the target model in step S2 is a random forest model.

Optionally, the target model in step S2 is a support vector machine.

Optionally, the iterative cycle condition in step S12 is an increase in the prediction performance indicator AUC cached in step S9 meets a preset condition.

Optionally, that the increase in the prediction performance indicator AUC cached in step S9 meets the preset condition includes: the increase in the prediction performance indicator AUC cached in step S9 is less than 5% for five consecutive rounds.

Based on the above descriptions, a computer device is provided, including a business data processing apparatus, where the business data processing apparatus is configured to execute the above method.

Figure 2:
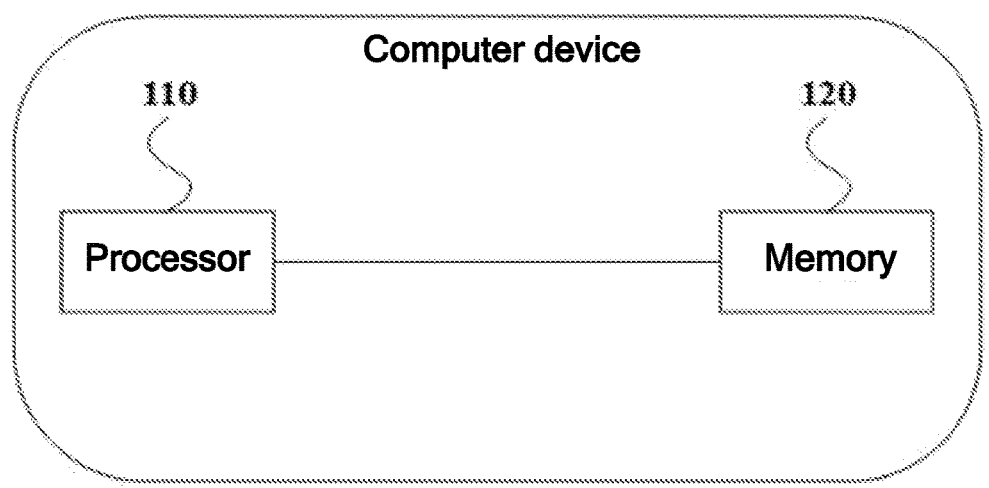
FIG. 2 is a diagram of a hardware structure of a computer device according to an embodiment of the present invention.

Based on the above descriptions, as shown in FIG. 2, a computer device 100 is provided, including a processor 110 and a memory 120 that communicate with each other, where the processor 110 is configured to obtain a computer program from the memory 120, and run the computer program to implement the above method.

Based on the above descriptions, a computer-readable storage medium is provided. A computer program is stored on the computer-readable storage medium, and the computer program is configured to be run to implement the above method.

To sum up, based on the above solutions, the present invention can apply a device-based anti-fraud model established based on a large quantity of domestic anti-fraud samples to an overseas credit and loan business. An anti-fraud model finally deployed in an overseas market combines samples from the domestic anti-fraud model and a small quantity of fraud samples accumulated at an initial stage of the overseas market, and adjusts weights of the two types of samples in a molding process based on the algorithm design in part 4 by using an adaptive method. In this way, expanded modeling samples are more approximate to samples of the overseas credit and loan business, and generalization performance of the model in a new scenario is improved.

The algorithm used in the present invention adjusts weights of a sample from a target customer group (overseas business sample) and a sample from an auxiliary customer group (domestic business sample) based on a modeling prediction loss.

(1) For the sample individual from the target customer group, when the sample individual is correctly predicted by the model, its weight is decreased; when the sample individual is incorrectly predicted, its weight is increased. This is to reduce use of typical sample information that can be easily predicted, and use more sample information that cannot be easily predicted, to improve a prediction capability of the model for the target customer group.

(2) For the sample individual from the auxiliary customer group, when the sample individual is correctly predicted by the model, its weight is increased; when the sample individual is incorrectly predicted, its weight is decreased. This is due to the fact that the sample from the auxiliary customer group is different from that from the target customer group, the correctly predicted sample is more approximate to the target customer group, and the misclassified sample is greatly deviated from the target customer group. Therefore, information of more samples approximate to the target customer group is needed to increase a sample quantity and reduce interference of a difference between customer groups to model training, thereby improving the prediction capability of the model for the target customer group.

Based on a plurality of iterations, a final model selection method is based on a prediction performance indicator AUC of the sample from the target customer group (data set T), and also ensures applicability of a modeling result to the target customer group.

In addition, a single model instead of model ensembling is used as a final modeling result, which is conducive to maintaining interpretability of the model, and reducing a deployment difficulty and a requirement for computing resources.

Described above are merely embodiments of the present invention, and are not intended to limit the present invention. Various changes and modifications can be made to the present invention by those skilled in the art. Any modifications, equivalent replacements, improvements, etc. made within the spirit and principle of the present invention should be included within the protection scope of the claims of the present invention.

What is claimed is:

1. A business data processing method, applied to a computer device,
comprising the following steps:
step S1: obtaining, from a target data platform, first anti-fraud variables and first fraudulent customer labels of P first business projects in a first business region to form P first anti-fraud modeling sample data sets, wherein the first anti-fraud variables are used as first prediction variables for modeling, the first fraudulent customer labels are used as first response variables for modeling, and P is a positive integer;
step S2: training one target model based on each of the P first anti-fraud modeling sample data sets, selecting, from P target models, a model with a highest area under curve (AUC) value as a model S, determining a modeling sample data set of the model S as a data set S, and using a variable combination of the model S as a variable combination S;
step S3: obtaining, from the target data platform, a second anti-fraud variable and a second fraudulent customer label of a second business project in a second business region based on the variable combination S to form a second anti-fraud modeling sample data set as a data set T, wherein the second anti-fraud variable is used as a second prediction variable for modeling, and the second fraudulent customer label is used as a second response variable for modeling;
step S4: merging the data set S and the data set T to obtain a data set A, wherein a quantity of samples in the data set S is n, and a quantity of samples in the data set T is m; and numbering sample individuals in the data set A from 1 to n+m, wherein sample individuals numbered from 1 to n are from the data set S, sample individuals numbered from n+1 to n+m are from the data set T, and n and m are positive integers;
step S5: allocating initial weights to the sample individuals in the data set A;
step S6: setting an integer variable t for recording a quantity of iterations, and setting the integer variable t to 1, wherein t is a positive integer;
step S7: training a model At for the data set A based on a current sample weight by using the variable combination S;
step S8: calling the model At to predict the samples in the data set A and output a probability of a fraudulent label, and determining a prediction loss et of the model At relative to the data set T;
step S9: determining a prediction performance indicator AUC of the model At relative to the data set T, and caching the prediction performance indicator AUC and a model prediction result corresponding to the probability of the fraudulent label;
step S10: determining and updating weights of the samples in the data set T based on the prediction loss et;
step S11: updating and iterating the integer variable t, and increasing a value of the integer variable t by 1;
step S12: performing cyclic iteration on steps S7 to S11 until an iterative cycle condition is met, to obtain x to-be-processed models; and
step S13: determining a final model based on a prediction performance indicator AUC of each to-be-processed model in the x to-be-processed models relative to the data set T, and extracting a model parameter corresponding to the final model to be a modeling parameter corresponding to the second business project.

2. The business data processing method according to claim 1, wherein in step S5, the step of allocating the initial weights to the sample individuals in the data set A comprises:
setting a weight of each sample individual of the data set A from the data set S to 1/n; and
setting a weight of each sample individual of the data set A from the data set T to 1/m.

3. The business data processing method according to claim 1, wherein the target model in step S2 is a logistic regression model.

4. The business data processing method according to claim 1, wherein the target model in step S2 is a random forest model.

5. The business data processing method according to claim 1, wherein the target model in step S2 is a support vector machine.

6. The business data processing method according to claim 1, wherein the iterative cycle condition in step S12 is: an increase in the prediction performance indicator AUC cached in step S9 meets a preset condition.

7. The business data processing method according to claim 6, wherein that the increase in the prediction performance indicator AUC cached in step S9 meets the preset condition comprises: the increase in the prediction performance indicator AUC cached in step S9 is less than 5% for five consecutive rounds.

8. A computer device, comprising a business data processing apparatus, wherein the business data processing apparatus is configured to execute the business data processing method according to claim 1.

9. The computer device according to claim 8, wherein in step S5, the step of allocating the initial weights to the sample individuals in the data set A comprises:
   setting a weight of each sample individual of the data set A from the data set S to 1/n; and
   setting a weight of each sample individual of the data set A from the data set T to 1/m.

10. The computer device according to claim 8, wherein the target model in step S2 is a logistic regression model.

11. The computer device according to claim 8, wherein the target model in step S2 is a random forest model.

12. The computer device according to claim 8, wherein the target model in step S2 is a support vector machine.

13. The computer device according to claim 8, wherein the iterative cycle condition in step S12 is: an increase in the prediction performance indicator AUC cached in step S9 meets a preset condition.

14. The computer device according to claim 13, wherein that the increase in the prediction performance indicator AUC cached in step S9 meets the preset condition comprises: the increase in the prediction performance indicator AUC cached in step S9 is less than 5% for five consecutive rounds.

15. A computer device, comprising a processor and a memory, wherein the processor and the memory communicate with each other, and the processor is configured to obtain a computer program from the memory and run the computer program to implement the business data processing method according to claim 1.

16. The computer device according to claim 15, wherein in step S5, the step of allocating the initial weights to the sample individuals in the data set A comprises:
   setting a weight of each sample individual of the data set A from the data set S to 1/n; and
   setting a weight of each sample individual of the data set A from the data set T to 1/m.

17. The computer device according to claim 15, wherein the target model in step S2 is a logistic regression model.

18. The computer device according to claim 15, wherein the target model in step S2 is a random forest model.

19. The computer device according to claim 15, wherein the target model in step S2 is a support vector machine.

20. A non-transitory computer-readable storage medium, wherein a computer program is stored on the computer-readable storage medium, and the computer program is configured to be run to implement the business data processing method according to claim 1.

\* \* \* \* \*